United States Patent

Genster

[11] Patent Number: 6,091,174
[45] Date of Patent: Jul. 18, 2000

[54] ELECTRIC MOTOR

[75] Inventor: Albert Genster, Marl, Germany

[73] Assignee: Wilo GmbH, Dortmund, Germany

[21] Appl. No.: 09/202,696

[22] PCT Filed: Apr. 30, 1997

[86] PCT No.: PCT/EP97/02219

§ 371 Date: Dec. 17, 1997

§ 102(e) Date: Dec. 17, 1998

[87] PCT Pub. No.: WO97/49162

PCT Pub. Date: Dec. 24, 1997

[30] Foreign Application Priority Data

Jun. 18, 1996 [DE] Germany ............. 196 24 145

[51] Int. Cl.$^7$ ............. H02K 5/00
[52] U.S. Cl. ............. 310/89; 310/64; 310/58;
310/54; 310/52; 310/67 R; 310/68 R
[58] Field of Search ............. 310/89, 64, 58,
310/54, 52, 67 R, 68 R, 91

[56] References Cited

U.S. PATENT DOCUMENTS

| | | |
|---|---|---|
| 2,410,973 | 12/1946 | Hoover . |
| 4,931,678 | 6/1990 | Lutz . |
| 5,049,769 | 9/1991 | Reinhardt ............. 310/64 |
| 5,731,643 | 3/1998 | Avakian et al. ............. 310/53 |
| 5,763,969 | 6/1998 | Metheny et al. ............. 310/62 |
| 5,796,191 | 8/1998 | Schwanda ............. 310/58 |
| 5,798,587 | 8/1998 | Lee ............. 310/58 |

FOREIGN PATENT DOCUMENTS

| | | |
|---|---|---|
| 0 629 780 A1 | 12/1994 | European Pat. Off. . |
| 36 42 729 A1 | 6/1988 | Germany . |
| 37 05 909 C2 | 2/1990 | Germany . |
| 38 42 588 A1 | 6/1990 | Germany . |
| 40 14 918 A1 | 11/1991 | Germany . |
| 41 21 430 C1 | 11/1992 | Germany . |
| 42 14 457 A1 | 12/1992 | Germany . |
| 42 17 457 A1 | 12/1992 | Germany . |
| 44 22 394 C1 | 12/1993 | Germany . |
| 42 31 784 A1 | 3/1994 | Germany . |
| 43 31 784 A1 | 3/1994 | Germany . |
| 44 19 215 A1 | 12/1995 | Germany . |
| 44 35 510 C1 | 3/1996 | Germany . |
| 2 174 253 | 10/1986 | United Kingdom . |

*Primary Examiner*—Nestor Ramirez
*Assistant Examiner*—Thanh Lam
*Attorney, Agent, or Firm*—Herbert Dubno

[57] ABSTRACT

A motor and pump assembly in which the circulating liquid from the pump passes through the motor and in which the motor housing has an outer shell closed at its end remote from the pump by a metal cover having an inwardly-extending annular collar fitting against an inner side of the outer shell for heat transfer thereto. A heat-generating electronic component such as a frequency converter is mounted directly on an inner side of the cover.

6 Claims, 1 Drawing Sheet

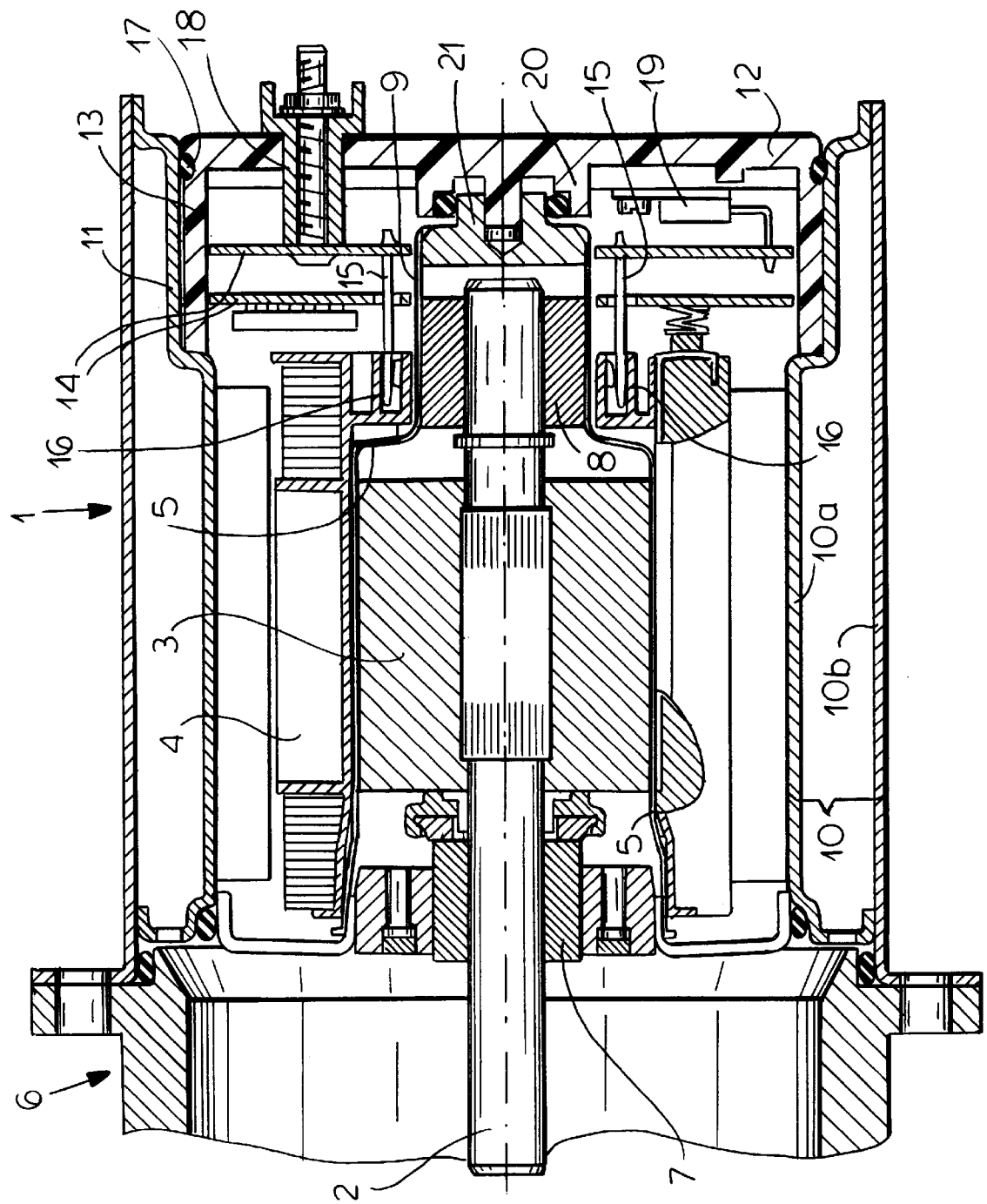

ELECTRIC MOTOR

CROSS REFERENCE TO RELATED APPLICATIONS

This application is a national stage of PCT/EP97/02219 filed Apr. 30, 1997 and based, in turn, on German national application 196 24 145.6 filed Jun. 18, 1996.

FIELD OF THE INVENTION

The invention relates to an electric motor, especially a split-ring motor for a centrifugal pump, having an outer housing surrounding the motor and traversed by the displaced liquid for cooling.

BACKGROUND OF THE INVENTION

Electric motors with frequency converters are known wherein the electronic components which generate heat, are provided within the electric motor in proximity to the displaced medium in order to cool these components. The resulting expensive construction is costly in part because of its construction and/or because it requires, within the pump, relatively considerable space.

OBJECT OF THE INVENTION

The object of the invention is to so improve an electric motor of the type initially described that it can achieve a high cooling effectiveness with a simple construction and mounting as well as with reduced dimensions.

SUMMARY OF THE INVENTION

This object is achieved according to the invention in that the motor space is closed at the side turned toward the driven side by a housing cover of metal on whose inner side a heat sink is applied with heat-generating components of the electronic circuitry and whose outer edge lies on the outer housing which is cooled. Such a housing cover at an end can optimally be used as a heat sink for electronic components. It is simple to fabricate and can be easily applied from the exterior. It is not only cooled by the external air but is also cooled by the displaced liquid. It is thus especially advantageous when the cover has a shield shape.

An optimum cooling is then achieved when the cover is composed of aluminum. It is also especially advantageous when the cover is formed with a cylindrical collar which rests against the inner side of the outer housing or shell for heat transfer thereto.

Preferably, according the invention, the heat-generating electronic components are directly affixed on the inner side of the cover.

DESCRIPTION OF THE DRAWING

The above and other objects, features, and advantages will become more readily apparent from the following description, reference being made to the accompanying drawing, the sole FIGURE of which is a diagrammatic axial section of a split-ring motor and pump assembly provided with the cover of the invention.

SPECIFIC DESCRIPTION

A split-ring motor for a centrifugal pump comprises a shaft 2 which carries a rotor 3. The rotor 3 is surrounded by a stator 4 and between them is a cup-shaped split-ring 5. The interior of the split cup 5 is traversed by the displaced liquid of the circulating pump 6.

The shaft 2 carries on its driving side the impeller (not shown) of the pump 6 and is held in respective bearing 7 on its side proximal to the pump 6 and the respective bearing 8 at its end turned away from the pump. The bearing 8 remote from the pump 6 is held in a step-shaped constriction 9 of the split cup 5.

The stator 4 is surrounded by an outer shell or housing which is traversed by the displaced liquid. The outer shell forms, with a cylindrical inner sheet-metal member 10a and a cylindrical outer sheet-metal member 10b, an annular space for the displaced cooling liquid.

The inner sheet-metal member 10a is set back in a step-like manner at its side turned away from the pump and in this step 11 a coaxial housing cover 12 which has a cylindrical collar 13 is received. The collar 13 thus lies tightly against the step 11 which has a greater internal diameter than the diameter of the remainder of the inner sheet-metal member 10a, so as to transfer heat from the cover 12 to the inner sheet-metal member 10a and thus to the displaced liquid.

At the inner side of the metal housing cover 12, which can be composed of aluminum, at least one electronic component, especially a frequency converter, is tightly fastened thereagainst so that the heat of the electronic component is transferred to the cover 12. In addition, within the cylindrical collar 13 at least—one plate 14, parallel to the cover 12 is arranged with an electronic component carrier, such that a plurality of pins 15 project into a corresponding number of sleeves 16 at the end of the motor stator to establish contact therewith. In the embodiment shown, two plates 14 and two contact pins 15 cooperate with two sleeves 16.

The housing cover need only be inserted from the end of the motor inwardly to establish electrical contact and seat it firmly in place. In this case there is provided a ring seal 17 between the collar 13 and the step 11 of the inner sheet-metal member 10a. In addition, the housing cover 12 has a passage 18 for the electrical connection.

On the inner side of the housing cover 12, at least one coaxial projection is formed which receives an O ring in which the step-shaped constriction 9 of the split cup 5 is received or on which the constriction is mounted, whereby at the end of the constriction 9, a retaining part 21 is fixed in the split cup and rests against a projection 20 or lies in the latter. In this manner a vibration-damping connection is obtained between bearing 8, split cup 5 and housing cover 12.

I claim:

1. A motor/pump assembly comprising:
 a split-ring motor having
   an outer metal shell,
   a stator in said outer metal shell, and
   a rotor in said shell having a shaft extending from one end of said of said shell;
 a circulating pump secured to said one end of said shell and driven by said shaft, liquid from said circulating pump passing through said shell of said motor;
 a metal housing cover closing an opposite end of said outer metal shell and having an axially extending annular collar fitting against an inner side of said outer shell for heat transfer thereto; and
 a heat-generating electronic component mounted directly on an inner side of said cover.

2. The assembly defined in claim 1, further comprising a ring seal between said collar and said inner side of said outer shell.

3. The assembly defined in claim 2, further comprising a cup extending from said one end along said stator to a constriction at said opposite end, and a bearing supporting said rotor received in said constriction, said cover being provided with a projection coaxial with said collar and receiving said constriction.

4. The assembly defined in claim 3, further comprising an O-ring received between a retaining part in said constriction and said projection.

5. The assembly defined in claim 4, further comprising at least one plate mounted on said cover and formed with contact pins engaging in sleeves connected to said stator.

6. The assembly defined in claim 5 wherein said inner side of said outer metal shell is formed with a step receiving said collar and said electronic component is a frequency converter.

* * * * *